Patented Aug. 12, 1947

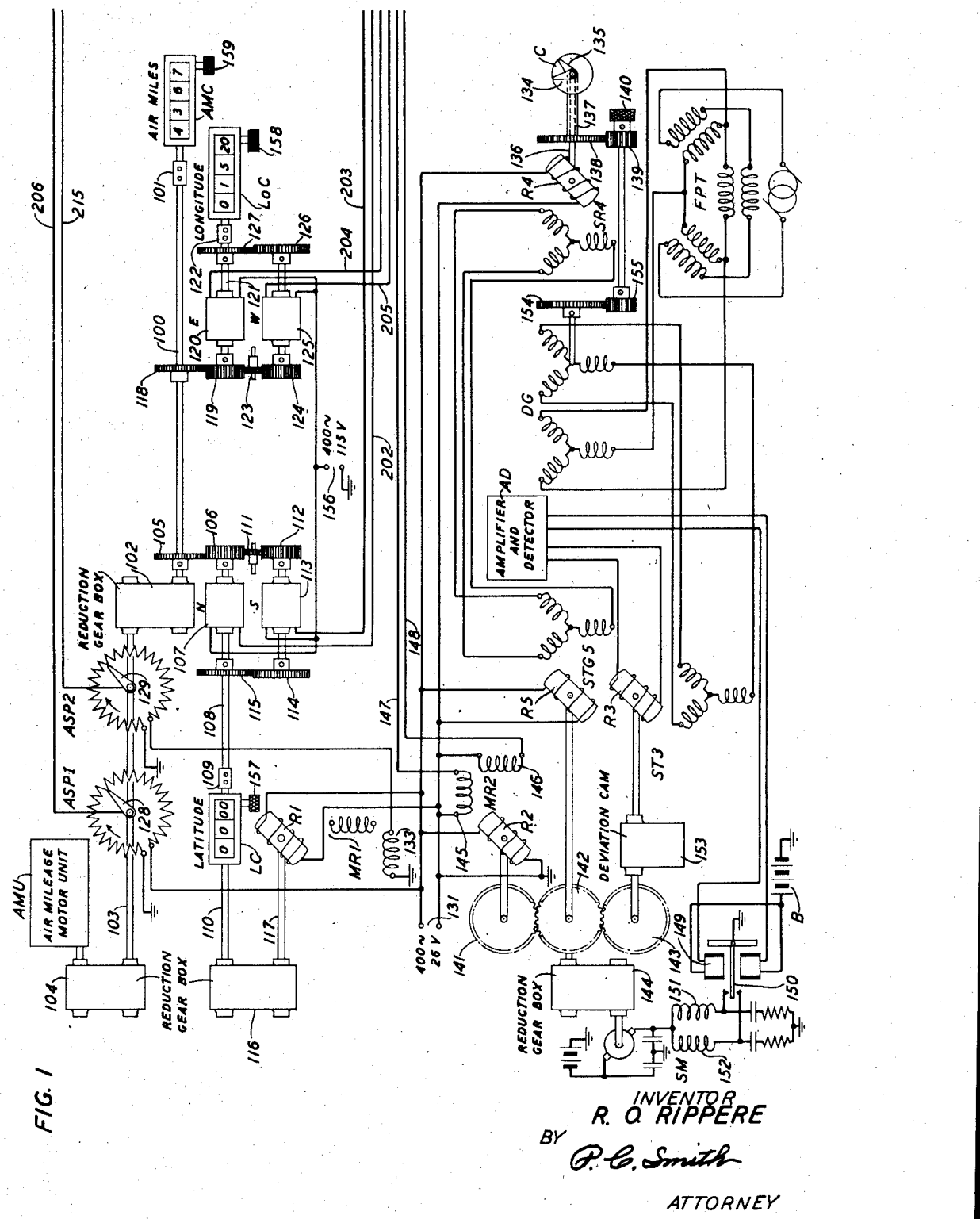

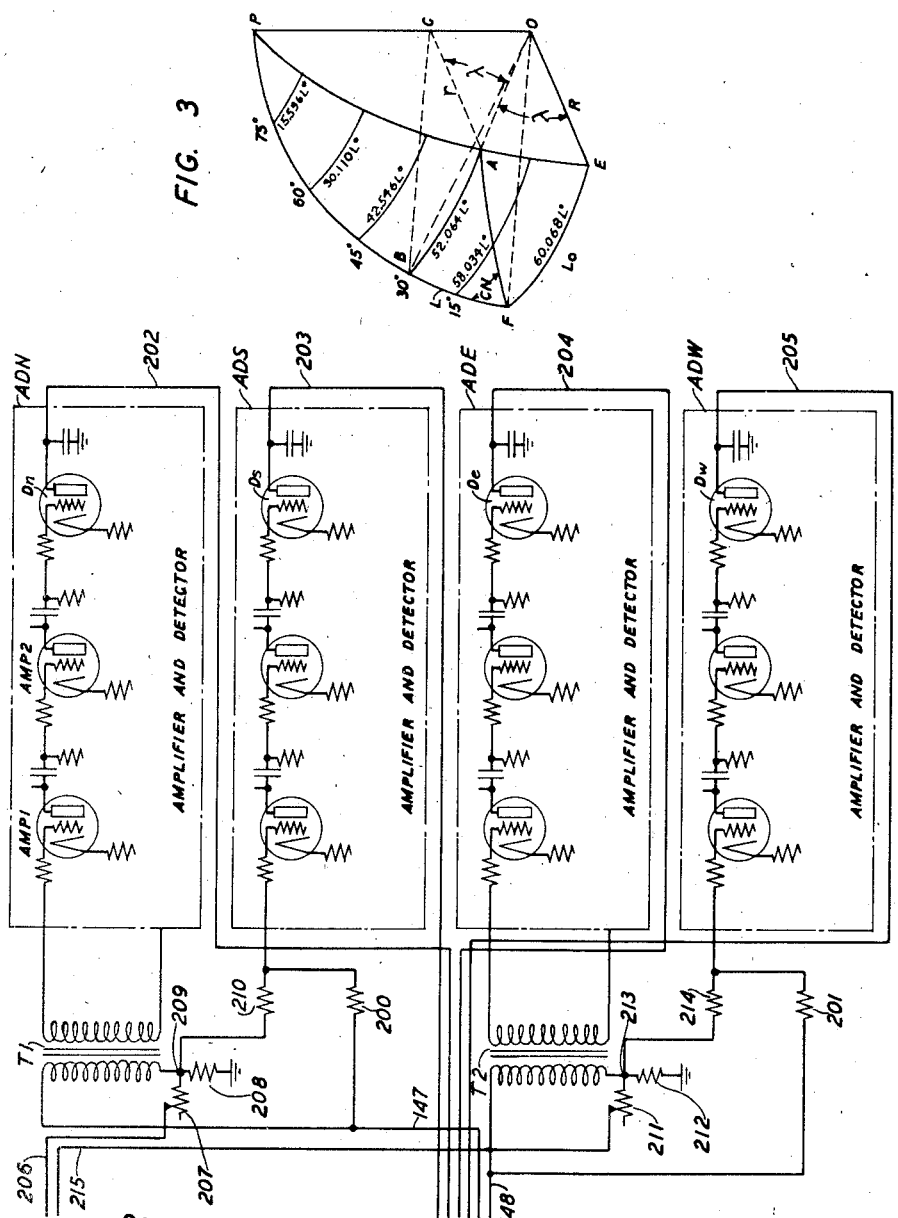

2,425,346

UNITED STATES PATENT OFFICE 2,425,346

AUTOMATIC DEAD RECKONING DEVICE

Robert O. Rippere, Massapequa, N. Y., assignor to Bell Telephone Laboratories, Incorporated, New York, N. Y., a corporation of New York Application October 2, 1944, Serial No. 556,794

14 Claims. (Cl. 235—61)

This invention relates to an air position indicator for use on an aircraft for enabling the pilot or navigator to determine at any instant the latitude and longitude of his position and the air miles he has flown from any specified take-off point.

More particularly the invention is concerned with the provision of electrical equipment for controlling indicators which continuously indicate the aircraft position in degrees and minutes of latitude and longitude and the air miles which have been flown. The utility of apparatus of this character is quite evident. On ships the problem of determining the ship's position at any instant is not difficult due to the slow speed at which surface ships sail and due to the fact that such ships always carry a navigator as a member of the crew who has ample time to make celestial observations, to do the navigational plotting that is necessitated from the data secured from such observations and to keep the necessary records of course and speed to enable a dead reckoning position to be always known. However, aircraft and particularly airplanes which have high cruising speeds, present a more difficult problem for solving navigational data to determine positions. This is particularly true of airplanes of the high speed type which may not have space to accommodate a navigator as a member of the crew. Furthermore, in aerial navigation under war conditions evasive action involves such frequent changes of course and speed that a navigator cannot keep an accurate log from which the dead reckoning position may be obtained. The apparatus which is the subject of this invention may be described as an automatic dead reckoning device.

Mechanical air position indicators have heretofore been proposed wherein counters are operated to indicate the latitude and longitude of airplane positions but such indicators, to reduce their weight so that they may be carried on airplanes, must be constructed of small light parts and, due to their complexity and delicacy of structure, are subject to error and are difficult to maintain in operation.

It is therefore the object of this invention to provide an air position indicator which has no complicated and delicate mechanism, which requires no power sources other than those normally available on the airplane in which it is installed and which is easily maintained in operation.

To attain this object three counters are provided which are driven from the air mileage motor unit of the airplane. One of these counters, which indicates the air miles flown, is connected to a shaft driven from the air mileage motor unit through reduction gearing so that the input shaft of the counter makes one revolution for each ten air miles flown. The other counters which indicate the degrees of latitude and the degrees of longitude of the instant position of the airplane are also driven from the shaft through magnetic clutches.

The operation of the latitude counter should be proportional to the true air speed times the cosine of the angle between the ground course of the airplane and true north. Similarly, the operation of the longitude counter should be proportional to the true air speed times the secant of the latitude angle times the sine of the angle between the ground course and true north. In accordance with the present invention the percentage of the time that the latitude counter is clutched to the shaft driven by the air mileage motor unit, which shaft is driven at a speed proportional to the true air speed, is made proportional to the cosine of the course angle as determined from the flux gate compass servo unit of the airplane and the percentage of the time that the longitude counter is clutched to the shaft is made proportional to the sine of the course angle multiplied by the secant of the latitude angle as determined by the setting of the latitude counter.

For controlling the clutching of the latitude counter to the air mileage motor driven shaft a potentiometer is provided the winding of which is energized from the 400-cycle 26-volt source of the airplane and the brush of which is driven by a motor at an appropriate speed. This motor may be the air mileage motor and is so described herein. From this potentiometer a potential is applied to the primary winding of the input transformer of a first amplifier-detector circuit. A magnetic resolver is also provided the rotor winding of which is also energized from the 400-cycle source and is rotatable with respect to its stator windings under the control of the compass servo motor so that the angular position of the rotor winding corresponds to the true compass angle of the flight course of the airplane. The two stator windings are so proportioned that the potentials induced into them from the rotor windings are proportional to the sine and cosine respectively of the angular position of the rotor and thus of the true course angle. The stator winding in which the cosine potential is induced, is connected to the primary winding of the input transformer of the amplifier-detector circuit. The potentiometer acts as a slow speed sawtoothed modulator of the 400-cycle potential applied to its winding and the input transformer continuously compares the magnitude of the compass cosine potential and the saw-toothed potential and applies the difference to the input side of the amplifier-detector circuit. The output side of the amplifier-detector circuit includes the winding of a clutch magnet and thus the clutch magnet becomes energized to couple the driving shaft of the latitude counter with the shaft driven by the air mileage motor unit whenever the cosine potential is greater than the sawtoothed potential. Thus if the course is due north the clutch will be continuously energized and if the course is due east or west or in a southerly direction the clutch will never operate. For any course in a northerly direction the clutch will engage for a percentage of the time proportional to the cosine of the course angle. Since the driving member of the clutch is turning at a speed proportional to the true air speed, the counter will integrate northerly flight or latitude.

For southerly flight it is necessary to operate the input shaft of the latitude counter in the reverse direction and therefore for this purpose the input shaft is connected through a second magnetic clutch and reversing gears to the shaft driven by the air mileage motor unit. The magnet of this clutch is connected to the output side of a second amplifier-detector circuit, the grid of the first amplifier tube of which is connected through high resistances to the brush of the potentiometer and to the stator winding of the magnetic resolver from which the cosine potential is derived. The saw-toothed potential from the potentiometer and the cosine potential are added by the second amplifier-detector circuit and because of the phase inversion of the cosine potential during southerly flight the clutch magnet controlled by this amplifier-detector circuit will be operable only during southerly flight.

Two similar amplifier-detector circuits are provided having clutch magnets connected into their output sides by which magnetic clutches are operable to control the clutching of the input shaft of the longitude counter to the shaft driven by the air mileage motor unit whereby the longitude counter is driven in one direction during an easterly flight and in the opposite direction during a westerly flight. The input side of one of the latter amplifier-detector circuits is coupled through an input transformer with the brush of a second potentiometer, which is driven by a motor at an appropriate speed (this may be the air mileage motor and is so described herein), and is also coupled through the input transformer with the other stator winding of the magnetic resolver. The winding of this potentiometer is energized from a stator winding of a second two-phase magnetic resolver the rotor winding of which is energized from the 400-cycle source and is oriented with respect to the stator windings through reduction gearing by the latitude counter. The stator windings of this magnetic resolver are so proportioned that the potentials induced therein from the rotor winding are proportional to the sine and cosine of the angle of latitude but, since only the cosine of the angle of latitude is of interest, the stator winding in which the sine potential is induced is left unconnected. The potential induced into the cosine winding of this magnetic resolver is impressed across the winding of the second potentiometer and the brush of such potentiometer being driven at a speed proportional to the true air speed a sawtoothed potential is generated and applied to the input of the latter two amplifier-detector circuits which is proportional to the cosine of the latitude angle. This potential is continuously compared with the compass sine potential. These potentials are so adjusted that the appropriate clutch magnet is continuously energized for due east or west flight at 75 degrees north or south latitude and the gearing is so selected as to register longitude correctly under these conditions. If the clutch is engaged continuously when on a due east course at latitude 75 degrees where the cosine of the latitude angle is valued at .2588, then at any lesser latitude on the same east course the clutch will be engaged for only part of the time, in the ratio of .2588 to the cosine of the instant latitude. The percentage of time engaged thus varies inversely with the cosine of latitude, or directly with the secant of latitude. At any other condition of flight integration of longitude will be accomplished correctly by the clutch controls.

For a clearer understanding of the invention and the mode of its operation reference may be had to the following detailed description thereof when read in connection with the accompanying drawing in which:

Fig. 1 shows the air miles, latitude and longitude counters, the mechanism by which they are driven from the air mileage motor unit under the control of the compass servo, and the compass and compass servo;

Fig. 2 shows the amplifier-detector circuits for controlling the clutch mechanism shown in Fig. 1; and Fig. 3 is a vector diagram explanatory of the theoretical aspects of the invention.

The air position indicator is provided with three counters AMC, LC and LoC and with a compass C. The input shaft of the air miles counter AMC advances the first counter wheel thereof one-tenth of a revolution for each air mile flown. This wheel is graduated 0 to 9 and the other wheels are advanced therefrom by decimal Geneva movements in the usual manner to register the tens, hundreds and thousands of miles. The input shaft of the air miles counter is connected by coupling 101 to the shaft 100 which is connected to the output shaft of the reduction gear box 102. The input shaft of this reduction gear box is connected through shaft 103 to the output shaft of the reduction gear box 104, the input shaft of which is connected to the output shaft of the air mileage motor unit AMU. Since it is assumed that the air mileage motor unit output shaft has a speed of 1440 revolutions per nautical mile the total gear reduction of the gear boxes 102 and 104 would be 1440 to 1 so that the input shaft of the air miles counter AMC will be advanced one-tenth of a revolution for each air mile flown.

Mounted on the shaft 100 is a gear 105 which meshes with gear 106 mounted on the driving shaft of the magnetic clutch 107. The driven shaft 108 of the clutch is connected in any desired manner, as by the coupling 109, with the input shaft 110 of the latitude counter LC. The input wheel of this counter, which is graduated 0 to 59 minutes, is rotated one revolution for each degree of latitude. The other wheels of the latitude counter are advanced by decimal Geneva movements in the usual manner to register the units and tens of the degrees of latitude. Also in mesh with the gear 106 is an idler pinion 111 which in turn meshes with the gear 112 mounted on the driving shaft of the magnetic clutch 113. The driven shaft of the clutch 113 is coupled to the shaft 108 by the unity ratio gears 114 and 115. The gears 111, 112 and 114 serve as reversing gears so that with the magnetic clutch 107 unengaged, the shaft 108 and consequently the input shaft 110 of the latitude counter LC is driven in the reverse direction from the shaft 100 in response to each energization of the magnetic clutch 113.

The input shaft 110 of the latitude counter is also connected through the reduction gear box 116 with the shaft 117 on which is secured the rotor R1 of the magnetic resolver MR1.

Mounted on the shaft 100 is a gear 118 which meshes with gear 119 mounted on the driving shaft or the magnetic clutch 120. The driven shaft 121 of the clutch is connected by the coupling 122 with the input shaft of the longitude counter LoC. The input wheel of this counter, which is graduated 0 to 59 minutes, is rotated one revolution for each degree of longitude. The other wheels of the longitude counter are advanced by decimal Geneva movements in the usual manner to register the units and tens of the degrees of longitude. Also in mesh with the gear 119 is an idler pinion 123 which in turn meshes with the gear 124 mounted on the driving shaft of the magnetic clutch 125. The driven shaft of the clutch 125 is coupled to the shaft 121 by the unity ratio gears 126 and 127. The gears 123, 124 and 126 serve as reversing gears so that with the magnetic clutch 120 unenergized the shaft 121 and consequently the input shaft of the longitude counter LoC is driven in the reverse direction from the shaft 100 in response to each energization of the magnetic clutch 125.

Mounted on the shaft 103 are the brushes 128 and 129 of two potentiometers ASP1 and ASP2, respectively. The winding of potentiometer ASP1 is bridged across the source 131 of 400-cycle, 26-volt current of the airplane and the winding of potentiometer ASP2 is connected in series with the horizontal stator winding 133 of the magnetic resolver MR1. Since the rotor winding of this magnetic resolver is energized from the source 131, a potential which varies with the cosine of the angle through which the rotor R1 is rotated through the setting of the latitude counter LC or the angle of latitude of the flight course, is impressed upon the winding of potentiometer ASP2. The brushes 128 and 129 could be driven at a speed commensurate with the true air speed from any desired source of power.

As a part of the air position indicator a compass C is provided with which a compass pointer 134 and a correction pointer 135 cooperate. The compass pointer 134 is driven by the rotor R4 of the synchro-receiver SR4 for indicating the true compass course of the flight and the correction pointer 135 is mounted on the sleeve 137 which carries the gear 138 and may be rotated, through the gear 138 and pinion 139 meshed therewith, by the correction knob 140 to indicate the amount of magnetic correction introduced.

For generating potentials which vary in accordance with the sine and cosine of the true course angle of the flight, a magnetic resolver MR2 is provided, the rotor R2 of which is rotatable through the unity ratio gears 141 and 142 and the reduction gear box 144 by the compass servo motor SM. The winding of rotor R2 is energized from the 400-cycle, 26-volt source 131 and is so positioned that for northerly or easterly flights the potentials produced in the stator windings 145 and 146 are in phase with the potentials produced by the potentiometers ASP1 and ASP2. The stator windings 145 and 146 of the magnetic resolver MR2 are positioned in quadrature, the horizontal stator winding 145, in which a potential which varies with the cosine of the true course angle is induced, being connected over conductor 147 with the primary winding of the input transformer T1 associated with the amplifier-detector circuit ADN and through resistance 200 with the input side of the amplifier-detector circuit ADS, and the vertical stator winding 146, in which a potential which varies with the sine of the true course angle is induced, being connected over conductor 148 with the primary winding of the input transformer T2 associated with the amplifier-detector circuit ADE and through resistance 201 with the input side of the amplifier-detector circuit ADW.

The servo motor SM is of the direct current reversible split field series-connected type and is controlled by the three-position differential relay 149. The armature 150 of relay 149 may be operated into engagement with either its upper or its lower contact to establish a circuit through one or the other of the field windings 151 and 152 of the motor SM to cause the motor to run in one or the other direction under the control of the amplifier-detector circuit AD and thus under the control of the output of synchro-transformer ST3.

For controlling the amplifier-detector circuit AD and servo-motor SM the flux gate primary transmitter FPT is connected with the stator windings of the differential generator DG, the Y-connected rotor windings of which are connected to the corresponding stator windings of the synchro-transformer ST3. The winding of the rotor R3 of the synchro-transformer is connected to the input side of the amplifier-detector circuit AD and is rotatable through the unity ratio gears 142 and 143 and through the deviation cam 153 represented by the box so labeled, by the servo motor SM. The rotor of the differential generator DG is rotatable by the setting knob 140 through the gears 154 and 155 to introduce a magnetic correction for the compass C. The gears 154 and 155 have the same gear ratio as the gears 138 and 139 so that the amount of rotation of the stator windings of the generator DG is indicated by the correction pointer 135 of the compass C.

In order that the pilot may have an indication of the true course which he is flying, the pointer 134 of the compass C is connected as previously described by shaft 136 with the rotor R4 of the synchro-receiver SR4, the stator windings of which are connected with the corresponding stator windings of the secondary transmitting generator STG5. The rotor R5 of the latter generator is rotatable by the servo motor SM and the winding of the rotor R5 of this generator and the winding of the rotor R4 of synchro-receiver SR4 are both energized from the source 131. The rotation of the rotor winding of the secondary transmitting generator STG5 by the servo motor SM is thus instrumental in rotating the compass pointer 134 with the magnetic correction introduced by the differential generator DG under the control of the setting knob 140 and the correction made by the deviation cam 153. With the differential generator DG interposed between the flux gate primary transmitter FPT and the synchro-transformer ST3, the rotor of transformer ST3 will, through the servo motor SM and the amplifier-detector circuit AD, follow the primary transmitter FPT but its position will differ by the magnetic correction angle introduced by the setting of the rotor windings of the differential generator DG as indicated by the correction pointer 135.

While the invention has been described in connection with its application to an airplane having a flux gate compass unit, it is to be understood that it is also applicable to an airplane having a "magnesyn" type compass unit. If the airplane were equipped with the latter type of compass unit, the servo motor SM would be controlled in the manner fully disclosed in Fig. 1B of the application Serial No. 527,999 of W. H. T. Holden, filed March 24, 1944.

Each of the amplifier-detector circuits of Fig. 2 is of a well-known type comprising first and second amplifier tubes AMP1 and AMP2 and a detector tube of the vacuum type D. These amplifier-detector circuits have been only schematically indicated it being understood that filament heating circuits, circuits for applying grid biases and circuits for applying anode potentials would be provided in the well-known manner. The anode of detector tube D$n$ of the amplifier-detector circuit ADN is supplied with anode potential over conductor 202 through the winding of the magnetic clutch 107 from the 115-volt, 400-cycle source 156, the anode of the detector tube D$s$ of amplifier-detector circuit ADS is supplied with anode potential over conductor 203 through the winding of the magnetic clutch 113 from the source 156, the anode of the detector tube D$e$ of amplifier-detector circuit ADE is supplied with anode potential over conductor 204 through the winding of the magnetic clutch 120 from the source 156 and the anode of the detector tube D$w$ of the amplifier-detector circuit ADW is supplied with anode potential over conductor 205 through the winding of the magnetic clutch 125 from the source 156. The source 156 is phased oppositely to the 400-cycle source 131.

It will be assumed that the source 131 is of phase $\varphi1$ and the source 156 is of phase $\varphi2$. The potential applied from the source 131 through the potentiometer ASP1 to junction point 209 and thus to the lower terminal of the primary winding of transformer T1 and to resistance 210 will, since potentiometer ASP1 has only resistance and no inductance, be unshifted in phase and thus be of phase $\varphi1$. Phase $\varphi1$ potential is also applied to the rotor winding of the manetic resolver MR2. The terminals of the stator winding 145 of the resolver MR2 are so connected to ground and to conductor 147 that on a northerly flight course the potential applied to the upper terminal of the primary winding of transformer T1 and to resistance 200 will be approximately of phase $\varphi1$. There will be a slight phase shift from the phase $\varphi1$ potential due to the inductance of the rotor and stator windings of the resolver MR2 but this phase shift will be of only a few degrees. The transformer T1 is so wound and connected to its input and output circuits as to invert the potential applied to its primary winding so that on a northerly flight course the potential applied to the control grid of the amplifier tube AMP1 of the amplifier-detector circuit ADN will be of approximately phase $\varphi2$ and through the phase inversion introduced by the amplifier tubes AMP1 and AMP2 potential of approximately phase $\varphi2$ will be applied to the control grid of the detector tube D$n$. While this grid potential may be slightly out of phase with the phase $\varphi2$ potential applied from the source 156 to the anode of tube D$n$, the tube being a vacuum tube and not too sensitive to a phase shift will fire only when the flight is in a northerly direction. At the same time the potentials applied through resistances 200 and 210 to the control grid of the first amplifier tube of the amplifier-detector circuit ADS will not be effective to cause a potential of approximately phase $\varphi2$ to appear on the control grid of the detector tube D$s$ to match the phase $\varphi2$ potential applied to the anode of such tube and the tube will therefore not fire.

On a southerly flight course when potential of approximately phase $\varphi2$ is applied to the upper terminal of transformer T1 and through resistance 200 and potential of phase $\varphi1$ is applied to the junction point 209, and the phase $\varphi2$ potential predominates, the potential applied through the transformer T1 and tubes AMP1 and AMP2 to the control grid of detector tube D$n$ will be of approximately phase $\varphi1$ and thus so out of phase with the potential applied to the anode of tube D$n$ that such tube will not fire. However, the predominant potential of approximately phase $\varphi2$ applied through the amplifier tube of the amplifier-detector circuit ADS to the control grid of detector tube D$s$ will be so nearly in phase with the phase $\varphi2$ potential applied to the anode of such tube that the tube will fire.

Similarly, the stator winding 146 of the magnetic resolver MR2 and the stator winding 133 of the magnetic resolver MR1 have their terminals so connected to ground and to the winding of the potentiometer ASP2 and to conductor 148 respectively that with phase $\varphi1$ potential connected from the source 131 to their rotor windings, potentials of approximately phase $\varphi1$ will be connected over conductors 215 and 148 when an easterly flight course is being flown. There may be slight shift of the phases of the potentials from the phase $\varphi1$ potential but these shifts will not be sufficient to prevent the proper response of the detector tube D$e$ and the non-response of the detector tube D$w$ on an easterly flight course.

On a westerly flight course when potential of approximately phase $\varphi2$ is applied to conductor 148 from the stator winding 146 of the resolver R2, potential of approximately phase $\varphi1$ will be applied to the control grid of detector tube D$e$ of the amplifier-detector circuit ADE and will be so out of phase with the potential applied to the anode of tube D$e$ that such tube will not fire, but the potential of approximately phase $\varphi2$ applied to the control grid of tube D$w$ of the amplifier-detector circuit ADW will be so nearly in phase with the phase $\varphi2$ potential applied to the anode of such tube that the tube will fire.

The apparatus employed in embodying the invention having now been described, the manner in which the apparatus functions will now be discussed. It will be assumed that the airplane in which the air position indicator is installed starts a flight from the position of 00 degrees 00 minutes latitude and 15 degrees 20 minutes longitude in the eastern and northern hemispheres. The pilot knows the latitude and longitude of the position of take-off and therefore resets the latitude and longitude counters LC and LoC by the operation of the reset knobs 157 and 158 associated therewith so that they indicate the position as disclosed in Fig. 1. It will be assumed that previous to the contemplated flight the airplane has flown 4367 nautical miles as indicated by the air miles counter AMC. If desired this counter may also be reset to 0000 miles at the start of the flight by the operation of the reset knob 159.

It will be assumed that a flight is made in the direction indicated by the line FA in Fig. 3 with a true course of C$_N$ degrees as indicated by the compass C and at such a true air speed that the distance traveled at the time of observation may be indicated by the vector FA. The latitude component FB of vector FA is therefore FA cos $C_N$ and the distance BA or $\rho$ along the latitude parallel through the point A is therefore FA sin $C_N$. The air speed is measured by the air miles motor unit AMU which drives the brushes 128 and 129 of the potentiometers ASP1 and ASP2 at an angular velocity $\omega_0$ commensurate with the air speed or $\omega_0 = K_0 Vt$ where the true air speed is expressed as $Vt$. As the flight progresses from the point of take-off F along the vector direction FA, the shaft 100 is driven through the gear boxes 104 and 102 to make one revolution per ten nautical miles of flight, resulting in the advance of the air miles counter AMC to indicate the air miles flown.

As the brush 128 of potentiometer ASP1 rotates over the winding of such potentiometer in a clockwise direction, which winding is energized from the 400-cycle 26-volt source 131, a potential is derived at the point of engagement of the brush with the winding which increases linearly from 0 to a maximum of 26 volts, until the brush leaves the lower terminal of the winding and engages the grounded terminal at which time the cycle repeats. Thus as the brush 128 rotates, a saw-tooth potential is derived at the brush. This saw-toothed potential is applied over a circuit extending over conductor 206 and through resistances 207 and 208 to ground whereby a varying potential $E_1$ having a saw-toothed characteristic is applied at the junction point 209 between resistances 207 and 208 to the lower terminal of the primary winding of input transformer T1 and through high resistance 210 to the control grid of the first amplifier tube of the amplifier-detector circuit ADS.

In response to the operation of the flux gate primary transmitter FPT, the synchro-transformer ST3 and the amplifier-detector circuit AD, the differential relay 149 is operated causing it to move its armature 150 into engagement with one or the other of its contacts thereby causing the establishment of a circuit from ground through one or the other of the field windings of servo motor SM, through the armature winding of such motor and to battery. The motor is thereupon operated and through the reduction gear box 144 and gears 142 and 143 the rotor R3 of the synchro-transformer ST3 is so positioned that it receives no potential and the output of the amplifier-detector circuit AD is thereupon reduced to zero and relay 149 will therefore receive no current. At that time the armature 150 of relay 149 will assume its mid-position thereby opening the circuit of motor SM.

The rotor R5 of the secondary transmitting generator STG5 is now rotated with the gear 142 through an angle commensurate with the true course angle $C_N$ of the flight course and, through the potentials induced therefrom into the stator windings of the generator STG5 and thereby into the stator windings of the synchro-receiver SR4, causes the orientation of the rotor winding R4 of the synchro-receiver SR4 through a corresponding angle $C_N$ which is indicated by the pointer 134 of the compass C.

At the same time through the gears 142 and 141 the rotor R2 of the magnetic resolver MR2 is turned through the same true course angle $C_N$ and, since the winding of rotor R2 is energized from the source 131, potentials are induced into the horizontal and vertical stator windings 145 and 146 of the resolver which may be expressed as $E_2 \cos C_N$ and $E_2 \sin C_N$ where $E_2$ is the potential applied from the source 131 to the rotor winding R2 and, as previously stated, $C_N$ is the angular displacement of the rotor R2 with respect to true north.

The potential induced into the horizontal stator winding 145 is impressed over conductor 147 upon the upper terminal of the primary winding of input transformer T1 and through high resistance 200 upon the control grid of the first amplifier tube of the amplifier-detector circuit ADS. It will be noted that the saw-toothed potential $E_1$ derived from the potentiometer ASP1 and the potential $E_2 \cos C_N$ derived from the magnetic resolver MR2 are both impressed upon the primary winding of the transformer T1 and that these potentials are also applied additively to the control grid of the first amplifier tube of the amplifier-detector circuit ADS. The resistance 207 is made adjustable so that the maximum of the potential $E_1$ derived from the potentiometer ASP1 may be made substantially equal to the maximum of the potential $E_2 \cos C_N$.

The input transformer T1 serves to continuously compare the potentials $E_1$ and $E_2 \cos C_N$. When during each positive half cycle of the source 131 the potential $E_2 \cos C_N$ is greater than the potential $E_1$, then current will flow upwardly in the primary winding of transformer T1 from the lower terminal of the winding then at the lower negative potential $E_1$ to the upper terminal positive of the winding then at the higher negative potential $E_2 \cos C_N$ and as a consequence a potential will be induced into the secondary winding of the transformer T1 which will make the control grid of the amplifier tube AMP1 more positive. Tubes AMP1 and AMP2 will amplify this potential resulting in making the control grid of the detector tube $Dn$ more positive at the instant that the anode of tube $Dn$ is rendered positive from the source 156. Since the potentials applied to the grid and anode of tube $Dn$ are in phase this tube will become conducting to establish the cathode-anode circuit therethrough extending over conductor 202 and through the winding of clutch magnet 107. Magnet 107 will therefore operate to clutch the shaft 100 driven by the air miles motor unit AMU through the gears 105 and 106 to the shaft 108 whereby the latitude counter LC is driven. The clutch magnet 107 will be continuously energized if the flight course is due north since the potential $E_2 \cos C_N$ will have its maximum value and will at all times be greater than or equal to the potential $E_1$.

If the flight course changes from a northerly direction to a direction due east, the value of the course angle $C_N$ will change from 0 degrees to 90 degrees and the potential $E_2 \cos C_N$ will change from the maximum value equal to the maximum value of potential $E_1$ to 0 and as a consequence during each saw-toothed wave of potential $E_1$, the value of the potential $E_2 \cos C_N$ may have a value greater than the instant value of the potential $E_1$ or a value less than the instant value of the potential $E_1$. Thus during that portion of each saw-toothed wave of potential $E_1$, when the potential $E_2 \cos C_N$ is greater than the instant potential $E_1$, the magnet 107 will be energized. However, during the portion when the potential $E_2 \cos C_N$ applied to the upper terminal of the primary winding of transformer T1 is less than the potential $E_1$ applied to the lower terminal of the primary winding, current will flow downwardly in the primary winding and as a consequence a potential will be induced into the secondary winding of the transformer T1 which will make the control grid of the amplifier tube AMP1 less positive, whereby the potential applied to the control grid of detector tube $D_n$ will be more negative or out of phase with the anode potential applied to the anode of tube $D_n$ from the source 156. Consequently tube $D_n$ will not conduct and the clutch magnet 107 will therefore become de-energized.

As the value of the potential $E_2 \cos C_N$ decreases as the the flight course becomes more easterly, the period during each saw-toothed wave in which the clutch magnet 107 will be energized will decrease until when the flight course becomes due east the magnet 107 will not be energized at all.

From the foregoing discussion, it will be evident that when the flight course is due north, the latitude counter will be continuously driven from the shaft 100 at a rate proportional to the true air speed of the flight and that therefore the latitude indicator will change at the maximum rate commensurate with the true air speed, but as the flight course turns easterly, the latitude counter will be driven from the shaft 100 in increasingly shorter periods, also commensurate with the true air speed until when the flight course is due east, the counter will cease to advance.

At the same time the potentials $E_1$ and $E_2 \cos C_N$ have been applied through resistances 210 and 200 to the control grid of the first amplifier tube of the amplifier-detector circuit ADS. The summation of these potentials is amplified by the amplifier tubes of this amplifier-detector circuit and applied to the control grid of the detector tube $D_s$. However, on a flight in a northerly direction, the potential applied to the grid of tube $D_s$ will be out of phase with the potential applied to the anode of such tube, from the source 156 and consequently, tube $D_s$ will not become conducting to close the energizing circuit of the clutch magnet 113.

Should the flight course turn southerly then the flight course angle $C_N$ with respect to north becomes greater than 90 degrees and the magnetic resolver MR2 then produces a potential in its horizontal stator winding 145 which is of opposite phase and may be expressed $-E_2 \cos C_N$. Thus during each positive half wave cycle of the source 131, when the potential $E_1$ is applied to the lower terminal of the primary winding of transformer T1, the positive potential $-(-E_2 \cos C_N)$ will be applied to the upper terminal of the primary winding and the negative potential $E_1$ will therefore be more negative than the potential $-(-E_2 \cos C_N)$, resulting in the downward flow of current in the primary winding, thereby inducing a potential in the secondary winding which renders the control grid of the first amplifier tube AMP1 more negative. As a result, the potential applied to the control grid of detector tube $D_n$ will be out of phase with the anode potential applied to such tube from the source 156 and consequently the clutch magnet 107 will not operate.

Now during each positive half cycle of the source 131, when negative potential $E_1$ is applied through resistance 210 to the control grid of the first amplifier tube of the amplifier-detector circuit ADS, positive potential $-(-E_2 \cos C_N)$ is applied through resistance 200 to the grid of such amplifier tube. As a consequence, during the portion of each saw-toothed wave when the value of potential $-(-E_2 \cos C_N)$ is greater than the value of potential $E_1$, the resultant grid biasing potential applied through the operation of the amplifier tubes of the amplifier-detector circuits ADS to the grid of detector tube $D_s$ will be in phase with the anode potential applied from the source 156 to the anode of tube $D_s$ and current will therefore flow over the cathode-anode circuit of tube $D_s$ and over conductor 203 through the winding of clutch magnet 113 causing magnet 113 to energize to connect the shaft 100 through the gears 105, 106, 111, 112, 114 and 115 to the shaft 108 whereby the rotation of the shaft 100 driven from the air mileage motor unit AMU is instrumental in operating the latitude counter LC in the reverse direction to reduce its reading.

During the remaining portion of each saw-toothed wave when the value of potential $-(-E_2 \cos C_N)$ is less than the value of potential $E_1$, the resultant grid biasing potential applied through the operation of the amplifier tubes of the amplifier-detector circuits ADS to the grid of detector tube $D_s$ will be out of phase with the anode potential applied from the source 156 to the anode of tube $D_s$ and tube $D_s$ will not conduct and consequently the clutch magnet 113 will not be energized.

When the flight course becomes due south, the maximum value of potential $-(-E_2 \cos C_N)$ will be greater than or equal to the value of $E_1$ throughout each saw-toothed wave and consequently the clutch magnet 113 will be continuously energized to cause the latitude counter to be driven backwards at the maximum rate determined by the true air speed.

From the foregoing discussion, it will be seen that as the flight course turns more southerly, the latitude counter will be driven backwards at a speed determined by the true air speed and during increasingly longer periods until the flight course is due south, when the latitude counter will be continuously driven.

It is the well-known rule of geography that the change in longitude equivalent to the given departure varies in accordance with the secant of the average latitude angle. The basis for this assertion will be apparent from the following discussion considered in connection with the diagram of Fig. 3. It will be assumed that the longitude of point A with respect to the point F is to be determined. BA and FE are similar arcs of two circles and are proportional to the radii of such circles. Therefore, if BA be designated $\rho$ and FE be designated $L_o$, or the longitude of the point A, then $$\frac{BA}{FE} = \frac{\rho}{L_o} = \frac{r}{R} \text{ or } \rho = \frac{rL_o}{R} \qquad (1)$$

Now the latitude of the point A is the angle BOF which is equal to the angle AOE but angle AOE is equal to the angle OAC of the right-angle triangle OAC. If now the angle OAC be designated $l$ we have in the triangle OAC, $$AC = AO \cos l \text{ or } \cos l = \frac{AC}{OA} = \frac{r}{R} \qquad (2)$$

Substituting Equation 2 in Equation 1, we have $$\rho = L_o \cos l \text{ or } L_o = \frac{\rho}{\cos l} \text{ or } L_o = \rho \text{ secant } l$$

where $l$ is the latitude angle. So it follows that $$L_o = \frac{\rho}{\cos L} \text{ or } L_o = \rho \text{ secant } L$$

If it be assumed that the distance FE represents

L degrees of longitude at the equator, it will be seen that an airplane flying from point F to point E along the equator would have to fly 60.668 nautical miles to fly one degree of longitude, but if the airplane were to fly a course parallel to the equator at a point nearer the earth's pole, fewer nautical miles per degree would have to be flown. For example, at 15 degrees latitude 58.034 miles; at 30 degrees latitude 52.064 miles; at 45 degrees latitude 42.546 miles; at 60 degrees latitude 30.110 miles and at 75 degrees latitude 15.596 miles would have to be flown. Since flight above 75 degrees latitude north or south would not ordinarily be flown, values of miles per degree above 75 degrees need not be taken into consideration.

As previously described, through the setting of the latitude counter LC, the shaft 117 is turned whereby the rotor R1 of the magnetic resolver MR1 is turned through an angle corresponding to the angle of latitude $l$. As a consequence, since the rotor winding R1 is energized by potential $E_2$ from the source 131, a potential is induced into the horizontal stator winding 133 of this resolver which varies with the angular setting of the rotor R1 and has a value which may be expressed as $E_2 \cos l$. The winding of potentiometer ASP2 being connected in series with the horizontal stator windings 133, this potential is applied to the potentiometer winding.

As the brush 129 of potentiometer ASP2 rotates over the potentiometer winding in a clockwise direction, a potential is derived at the point of engagement of the brush with the winding which increases from 0 to a maximum, until the brush leaves the lower terminal of the winding. Thus as the brush 129 rotates, a saw-toothed potential is derived at the brush, the magnitude of which is determined by the angular setting of the resolver MR1 and by the instant position of the brush 129. This saw-toothed potential is applied over a circuit extending over conductor 215 and through resistances 211 and 212 to ground whereby a varying potential whose maximum value is $E_2 \cos l$, referred to as $E_3$, having a saw-toothed characteristics is applied at the junction point 213 between resistances 211 and 212 to the lower terminal of the primary winding of transformer T2 and through resistance 214 to the control grid of the first amplifier tube of the amplifier detector circuit ADW. Due to the setting of the rotor R1 of the magnetic resolver MR1 as the latitude angle $l$ increases from 0 degrees at the equator to 75 degrees north, the maximum value of each wave of the saw-toothed potential $E_3$ decreases from $E_2$ when the latitude angle is 0 degrees to .25882 $E_2$ when the latitude angle is 75 degrees.

As previously described through the setting of the rotor R2 of the magnetic resolver MR2 in response to the operation of the compass servo motor SM through an angle commensurate with the true course angle $C_N$, a potential is induced into the vertical stator winding 146 of this resolver which has a value $E_2 \sin C_N$. This potential is applied over conductor 148 to the upper terminal of the primary winding of the input transformer T2 and through the high resistance 201 to the control grid of the first amplifier tube of the amplifier-detector circuit ADW. This potential may be expressed as $E_4$ and is the potential value of the vector BA or $\rho$. The resistance 211 is made adjustable so that the value of the potential $E_4$ with respect to the potential $E_3$ is such that the clutch magnet 120 will be continuously energized on a flight due east or the clutch 125 will be continuously energized on a flight due west at 75 degrees latitude north or south and the gearing for driving the longitude counter LoC from the shaft 100 will be so selected that the longitude will be registered correctly under these conditions. At any other condition of flight, integration of longitude will be accomplished correctly by the clutch control circuits.

The input transformer T2 serves to continuously compare the potentials $E_3$ and $E_4$. When during each positive half cycle of the source 131, the potential $E_4$ becomes greater than the potential $E_3$ then current will flow upwardly in the primary winding of transformer T2 from the lower terminal of the winding, then at the lower negative potential $E_3$ to the upper terminal of the winding, then at the higher negative potential $E_4$ and as a consequence a potential will be induced into the secondary winding of the transformer T2 which will result in the application of an amplified potential to the control grid of detector tube De which is in phase with the anode potential applied to the anode of such detector tube from the source 156. Tube De will therefore become conducting to establish the cathode-anode circuit therethrough and extending over conductor 204 and through the winding of clutch magnet 120. Magnetic clutch 120 will therefore operate to clutch the shaft 100 driven by the air miles motor unit AMU through the gears 118 and 119 to the shaft 121 whereby the longitude counter LoC is driven.

When during each positive half cycle of the source 131, the potential $E_4$ becomes less than the potential $E_3$, then current will flow downwardly in the primary winding of transformer T2 and the potential induced into the secondary winding of such transformer, as amplified by the amplifier tubes of the amplifier-detector circuit ADE and applied to the control grid of the detector tube De, will be out of phase with the anode potential applied to the anode of tube De from the source 156 and consequently such tube will not fire and the clutch magnet 120 will not be energized.

Since the potential $E_4$ increases from zero to a maximum value when the angle of flight $C_N$ increases from 0 to 90 degrees and the average value of each saw-toothed wave of the potential $E_3$ decreases as the latitude angle $l$ increases from 0 to 75 degrees, it follows that the portions of each saw-toothed wave during which the potential $E_3$ will be less than the potential $E_4$ will increase as the angle of latitude $l$ increases and as the flight course becomes more easterly. Thus as a consequence, the percentage of time that the clutch magnet 120 is energized during each saw-toothed wave will similarly increase. As a result, when a due easterly course is being flown at the equator the percentage of time during which the clutch magnet 120 is energized will be small and the reading of the longitude counter will be advanced at a slow rate dependent upon the true air speed since the airplane must fly 60.068 nautical miles to traverse each degree of longitude, but when a due easterly course is being flown at 75 degrees latitude, the clutch magnet 120 will be continuously energized to advance the reading of the longitude counter continuously at the rate determined by the true air speed of the flight.

For flights having an easterly bearing at any degree of latitude, the percentage of time the clutch magnet 120 will be energized will be varied between these extremes through the comparison of the potentials $E_3$ and $E_4$ to integrate the longitude correctly. At the same time, the potentials $E_3$ and $E_4$ have been applied through resistances 201 and 214 to the control grid of the first amplifier tube of the amplifier-detector circuit ADW. The summation of these potentials is amplified by the amplifier tubes of this circuit and applied to the control grid of the detector tube $Dw$. However, in a flight in an easterly direction, the potential applied to the grid of tube $Dw$ will be out of phase with the potential applied to the anode of such detector tube from the source 156 and consequently tube $Dw$ will not become conducting to cause the energization of the clutch magnet 125.

Should the flight course turn westerly, then the flight course angle $C_N$ with respect to 0 becomes more than 180 degrees and the magnetic resolver MR2 then produces a potential in its vertical stator winding 146 which has a negative value and may be expressed $-(-E_2 \sin C_N)$ or $+E_4$. Thus during each positive half wave of the source 131 when the negative potential $E_3$ is applied to the lower terminal of the primary winding of transformer T2, the positive potential $+E_4$ will be applied to the upper terminal of the primary winding and resulting in the downward flow of current in the primary winding, thereby inducing a potential in the secondary winding of transformer T2 which renders the control grid of the first amplifier tube of the amplifier-detector circuit ADE more negative. As a result, the potential applied to the control grid of the detector tube $De$ will be out of phase with the anode potential applied to such tube from the source 156 and consequently the clutch magnet 120 will not operate.

Now during each positive half cycle of the source 131, when negative potential $E_3$ is applied through resistance 201 to the control grid of the first amplifier tube of the amplifier-detector circuit ADW, positive potential $+E_4$ is applied through resistor 214 to the grid of such tube. As a consequence during the portion of each saw-toothed wave when the value of potential $+E_4$ is greater than the potential $-E_3$, the resulting grid biasing potential applied through the operation of the amplifier tubes of the amplifier-detector circuit ADW, to the grid of detector tube $Dw$, will be in phase with the anode potential applied from the source 156 to the anode of tube $Dw$ and current will therefore flow in the cathode-anode circuit of tube $Dw$ and over conductor 205 through the winding of clutch magnet 125 causing the magnet 125 to engage the shaft 100 through the gears 118, 119, 123, 124, 126 and 127 with the shaft 122 whereby the rotation of shaft 100 by the air mileage motor unit AMU is instrumental in operating the longitude counter LoC in the reverse direction to reduce its reading.

During the remaining portion of each saw-toothed wave, when the value of potential $+E_4$ is less than the value of potential $-E_3$, the resultant grid biasing potential applied through the operation of the amplifier tubes of the amplifier-detector circuit ADW to the grid of detector tube $Dw$, will be out of phase with the anode potential applied from the source 156 to the anode of tube $Dw$, and tube $Dw$ will not conduct and consequently, the clutch magnet 125 will not be energized.

From the foregoing, it will appear that the longitude counter will be driven backwardly at a speed determined by the true air speed and during varying percentages of the time dependent upon the course angle $C_N$ and upon the latitude angle $l$.

Although the foregoing discussion of the mode of operation of the invention has been directed primarily to a flight north of the equator and east of the reference meridian, it is believed it will be evident how the invention would function on a flight north of the equator but west of the reference meridian or south of the equator and either east or west of the reference meridian.

As it may be found desirable to enable the latitude counter LC to advance from 00 degrees 00 minutes at the equator, through 00 degrees 01 minutes as a flight proceeds into the southern hemisphere and to enable the longitude counter LoC to advance from 00 degrees 00 minutes at the reference meridian through 00 degrees 01 minutes as a flight proceeds from the eastern into the western hemisphere these counters could be provided with reversing mechanism of the general character disclosed, for example, in the application Serial No. 527,998, of W. H. T. Holden, filed March 24, 1944, which reversing mechanism could be operated by the pilot when the flight crosses the equator or the reference meridian.

What is claimed is:

1. In an automatic dead-reckoning device for a craft, a source of current, a latitude indicator, a shaft rotatable at a speed commensurate with the speed of travel of said craft, a potentiometer operable for deriving a potential from said source, means controlled in accordance with the true course angle of said craft for deriving a potential from said source which varies in accordance with the cosine of the course angle, means for continuously comparing said potentials, and a clutch mechanism controllable by said comparing means to cause said latitude indicator to be driven from said shaft whenever said latter potential is greater than said first potential.

2. In an automatic dead-reckoning device for a craft, a source of current, a latitude indicator, a shaft rotatable at a speed commensurate with the speed of travel of said craft, a potentiometer operable for deriving a saw-toothed potential from said source, the periodicity of the saw-toothed waves of which varies in accordance with the speed of operation of said potentiometer, means controlled in accordance with the true course angle of said craft for deriving a potential from said source which varies in accordance with the cosine of the course angle, means for continuously comparing said potentials, and a clutch mechanism controllable by said comparing means to cause said latitude indicator to be driven from said shaft during the portion of each saw-toothed wave of said first potential when said latter potential is greater than the instant value of said first potential.

3. In an automatic dead-reckoning device for a craft, a source of current, a latitude indicator, a shaft rotatable at a speed commensurate with the speed of travel of said craft, a potentiometer operable for deriving a saw-toothed potential from said source, the periodicity of the saw-toothed waves of which varies in accordance with the speed of operation of said potentiometer, means controlled in accordance with the true course angle of said craft for deriving a potential from said source which varies in accordance with the cosine of the course angle, a transformer to the opposite terminals of the primary winding of which said potentials are applied for continuous comparison, an amplifier-detector circuit to the input side of which the control potential from the secondary winding of said transformer is applied, and a magnetic clutch operable by the output of said amplifier-detector circuit to cause said latitude indicator to be driven from said shaft during the portion of each saw-toothed wave of said first potential when said latter potential is greater than the instant value of said first potential.

4. In an automatic dead-reckoning device for a craft, a source of current, a latitude indicator, a shaft rotatable at a speed commensurate with the speed of travel of said craft, a potentiometer operable for deriving a saw-toothed potential from said source, the periodicity of the saw-toothed waves of which varies in accordance with the speed of operation of said potentiometer, means controlled in accordance with the true course angle of said craft for deriving a potential from said source which varies in accordance with the cosine of the course angle, an amplifier-detector circuit to the input side of which said potentials are additively applied as a control potential, and a magnetic clutch operable by the output of said amplifier-detector circuit to cause said latitude indicator to be driven from said shaft during the portion of each saw-toothed wave of said first potential when said latter potential is opposite in phase to and greater than the instant value of said first potential.

5. In an automatic dead-reckoning device for a craft, a source of current, a latitude indicator, a shaft rotatable at a speed commensurate with the speed of travel of said craft, gearing through which said indicator may be driven from said shaft in one direction, reversing gearing through which said indicator may be driven from said shaft in the other direction, a first magnetic clutch for rendering said first gearing effective to drive said indicator, a second magnetic clutch for rendering said reversing gearing effective to drive said indicator, a potentiometer operable for deriving a saw-toothed potential from said source, the periodicity of the saw-toothed waves of which varies in accordance with the speed of operation of said potentiometer, means controlled in accordance with the true course angle of said craft for deriving a potential from said source which varies in accordance with the cosine of the course angle, means for continuously comparing said potentials and causing said first magnetic clutch to be energized during the portion of each saw-toothed wave of said first potential when said latter potential is greater than said first potential, and means for adding said potentials to cause said second magnetic clutch to be energized during the portion of each saw-toothed wave of said first potential when said latter potential is opposite in phase to and greater than said first potential.

6. In an automatic dead-reckoning device for a craft source of current, a latitude indicator, a shaft rotatable at a speed commensurate with the speed of travel of said craft, gearing through which said indicator may be driven from said shaft in one direction, reversing gearing through which said indicator may be driven from said shaft in the other direction, a potentiometer operable for deriving a saw-toothed potential from said source, the periodicity of the saw-toothed waves of which varies in accordance with the speed of operation of said potentiometer, means controlled in accordance with the true course angle of said craft for deriving a potential from said source which varies in accordance with the cosine of the true course angle, a transformer to the opposite terminals of the primary winding of which said potentials are applied for continuous comparison, a first amplifier-detector circuit to the input side of which the control potential from the secondary winding of said transformer is applied, a first magnetic clutch operable by the output of said amplifier-detector circuit to render said first gearing effective during the portion of each saw-toothed wave of said first potential when said latter potential is greater, a second amplifier-detector circuit to the input side of which said potentials are additively applied as a control potential, and a second magnetic clutch operable by the output of said second amplifier-detector circuit to render said reversing gearing effective during the portion of each saw-toothed wave of said first potential when said latter potential is opposite in phase to and greater than said first potential.

7. In an automatic dead-reckoning device for a craft, a source of current, a longitude indicator, a latitude indicator, means for operating said latitude indicator to indicate the instant latitude position of said craft, a shaft rotatable at a speed commensurae with the speed of travel of said craft, a potentiometer the brush of which is rotatable, means controlled in accordance with the setting of said latitude indicator for deriving a first potential from said source which varies in accordance with the cosine of the angle of latitude and for applying such potential to the winding of said potentiometer whereby the rotation of said brush derives a second potential which varies in accordance with the speed of rotation of said brush and in accordance with the cosine of the latitude angle, means controlled in accordance with the true course angle of said craft for deriving a third potential from said source which varies in accordance with the sine of the course angle, means for continuously comparing said second and third potentials, and a clutch mechanism controllable by said comparing means to cause said longitude indicator to be driven from said shaft whenever said third potential becomes greater than said second potential.

8. In an automatic dead-reckoning device for a craft, a source of current, a longitude indicator, a latitude indicator, means for operating said latitude indicator to indicate the instant latitude position of said craft, a shaft rotatable at a speed commensurate with the speed of travel of said craft, a potentiometer the brush of which is rotatable, means controlled in accordance with the setting of said latitude indicator for deriving a first potential from said source which varies in accordance with the cosine of the angle of latitude and for applying it to the winding of said potentiometer whereby the rotation of said brush derives a second saw-toothed potential the periodicity of the saw-toothed waves of which varies in accordance with the speed of rotation of said brush and the magnitude in accordance with the cosine of the latitude angle, means controlled in accordance with the true course angle of said craft for deriving a third potential from said source which varies in accordance with the sine of the course angle, means for continuously comparing said second and third potentials, and a clutch mechanism controlled by said comparing means to cause said longitude indicator to be driven from said shaft during the portion of each saw-toothed wave of said second potential when said second potential is less than said third potential.

9. In an automatic dead-reckoning device for a craft, a source of current, a longitude indicator, a latitude indicator, means for operating said latitude indicator to indicate the instant latitude position of said craft, a shaft rotatable at a speed commensurate with the speed of travel of said craft, a potentiometer the brush of which is rotatable, means controlled in accordance with the setting of said latitude indicator for deriving a first potential from said source which varies in accordance with the cosine of the angle of latitude and for applying said potential to the winding of said potentiometer whereby the rotation of said brush derives a second saw-toothed potential, the periodicity of the saw-toothed waves of which varies in accordance with the speed of rotation of said brush and the magnitude in accordance with the cosine of the latitude angle, means controlled in accordance with the true course angle of said craft for deriving a third potential from said source which varies in accordance with the sine of the course angle, a transformer to the opposite terminals of the primary winding of which said second and third potentials are applied for continuous comparison, an amplifier-detector circuit to the input side of which the control potential from the secondary winding of said transformer is applied, and a magnetic clutch operable by the output of said amplifier-detector circuit to cause said longitude indicator to be driven from said shaft during the portion of each saw-toothed wave of said second potential when said second potential is less than said third potential.

10. In an automatic dead-reckoning device for a craft, a source of current, a longitude indicator, a latitude indicator, means for operating said latitude indicator to indicate the instant latitude of the position of said craft, a shaft rotatable at a speed commensurate with the speed of travel of said craft, a potentiometer the brush of which is rotatable, means controlled in accordance with the setting of said latitude indicator for deriving a first potential from said source which varies in accordance with the cosine of the angle of latitude and for applying said potential to the winding of said potentiometer whereby the rotation of said brush derives a second saw-toothed potential, the magnitude of the saw-toothed waves of which varies in accordance with the cosine of the latitude angle and the periodicity in accordance with the speed of rotation of said brush, means controlled in accordance with the true course angle of said craft for deriving a third potential from said source which varies in accordance with the sine of the course angle, an amplifier-detector circuit to the input side of which said second and third potentials are additively applied as a control potential, and a magnetic clutch operable by the output of said amplifier-detector circuit to cause said longitude indicator to be driven from said shaft during the portion of each saw-toothed wave of said second potential when said third potential is opposite in phase to and greater than said second potential.

11. In an automatic dead-reckoning device for a craft, a source of current, a longitude indicator, a latitude indicator, means for operating said latitude indicator to indicate the instant latitude position of said craft, a shaft rotatable at a speed commensurate with the speed of travel of said craft, gearing through which said longitude indicator may be driven from said shaft in one direction, reversing gearing through which said longitude indicator may be driven from said shaft in the other direction, a first magnetic clutch for rendering said first gearing effective to drive said longitude indicator, a second magnetic clutch for rendering said reversing gearing effective to drive said longitude indicator, a potentiometer the brush of which is rotatable, means controlled in accordance with the setting of said latitude indicator for deriving a first potential from said source which varies in accordance with the cosine of the angle of latitude and for applying said potential to the winding of said potentiometer whereby the rotation of said brush derives a second saw-toothed potential, the periodicity of the saw-toothed waves of which varies in accordance with the speed of rotation of said brush and the magnitude in accordance with the cosine of the latitude angle, means controlled in accordance with the true course angle of said craft for deriving a third potential from said source which varies in accordance with the sine of the course angle, means for continuously comparing said potentials and for causing said first magnetic clutch to be energized during the portion of each saw-toothed wave of said second potential when said second potential is less than said third potential, and means for adding said potentials to cause said second magnetic clutch to be energized during the portion of each saw-toothed wave of said second potential when said second potential is opposite in phase to and less than said third potential.

12. In an automatic dead-reckoning device for a craft, a source of current, a longitude indicator, a latitude indicator, means for operating said latitude indicator to indicate the instant latitude position of said craft, a shaft rotatable at a speed commensurate with the speed of travel of said craft, gearing through which said longitude indicator may be driven from said shaft in one direction, reversing gearing through which said longitude indicator may be driven from said shaft in the other direction, a potentiometer the brush of which is rotatable, means controlled in accordance with the setting of said latitude indicator for deriving a first potential from said source which varies in accordance with the cosine of the angle of latitude and for applying said potential to the winding of said potentiometer whereby the rotation of said brush derives a second saw-toothed potential, the periodicity of the saw-toothed waves of which varies in accordance with the speed of rotation of said brush and the magnitude in accordance with the cosine of the latitude angle, means controlled in accordance with the true course angle of said craft for deriving a third potential from said source which varies in accordance with the sine of the course angle, a transformer to the opposite terminals of the primary winding of which said potentials are applied for continuous comparison, a first amplifier-detector circuit to the input side of which the control potential from the secondary winding of said transformer is applied, a first magnetic clutch operable by the output of said amplifier-detector circuit to render said first gearing effective during the portion of each saw-toothed wave of said second potential when said second potential is less than said third potential, a second amplifier-detector circuit to the input side of which said second and third potentials are additively applied as a control potential, and a second magnetic clutch operable by the output of said second amplifier-detector circuit to render said reversing gearing effective during the portion of each saw-toothed wave of said second potential when said second potential is opposite in phase to and less than said third potential.

13. In an automatic dead-reckoning device for a craft, a source of current, an indicator for indicating the instant latitude position of the craft, an indicator for indicating the instant longitude position of said craft, a shaft rotatable at a speed commensurate with the speed of said craft, means controlled by said shaft for deriving potentials from said source which vary in accordance with the speed of said craft, means controlled in accordance with the true course angle of said shaft for deriving potentials from said source which vary in accordance with the sine and cosine of the true course angle, means for combining said first potentials with said latter potentials and clutch mechanisms responsive to said latter means for causing said indicators to be driven by said shaft to indicate the instant latitude and longitude of the position of said craft.

14. In an automatic dead-reckoning device for a craft, a source of current, an indicator for indicating the instant latitude position of the craft, an indicator for indicating the instant longitude position of said craft, a shaft rotatable at a speed commensurate with the speed of travel of said craft, a potentiometer controlled by said shaft for deriving a first potential from said source which varies in accordance with the speed of said craft, means controlled in accordance with the true course angle of said craft for deriving second and third potentials from said source which vary respectively in accordance with the cosine and sine of the true course angle, means for combining said first and second potentials, clutch mechanisms controlled by said latter means for causing said latitude indicator to be driven in one or the other direction from said shaft, a second potentiometer driven from said shaft, means for deriving a potential from said source which varies in accordance with the cosine of the latitude angle as determined by the setting of said latitude indicator and for applying said potential to said second potentiometer whereby a fourth potential is derived by said latter potentiometer which varies in accordance with the speed of travel and with the cosine of the latitude angle, means for combining said third and fourth potentials, and clutch mechanisms controlled by said latter means for causing said longitude indicator to be driven in one or the other direction from said shaft.

ROBERT O. RIPPERE.